June 9, 1925.                                                    1,541,641
E. J. GUAY
MANUFACTURE OF LAMINATED MATERIAL FROM SPINNABLE TEXTILE WOVEN
FABRICS AND AN ADHESIVE BINDER
Filed April 8, 1924
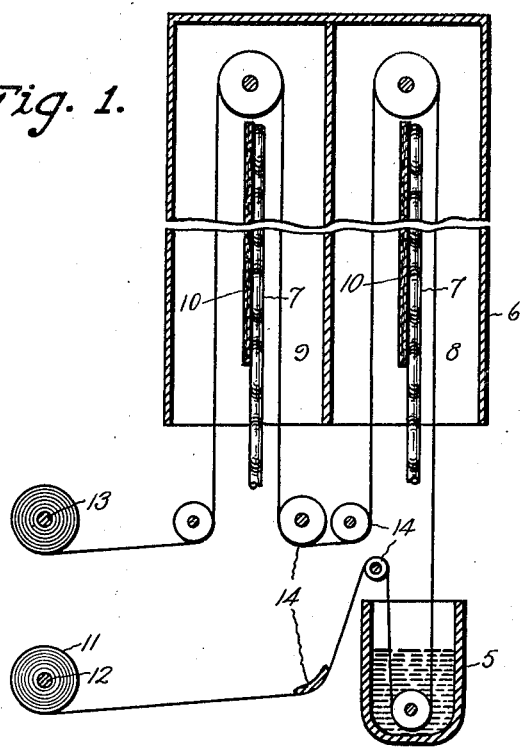
Fig. 1.
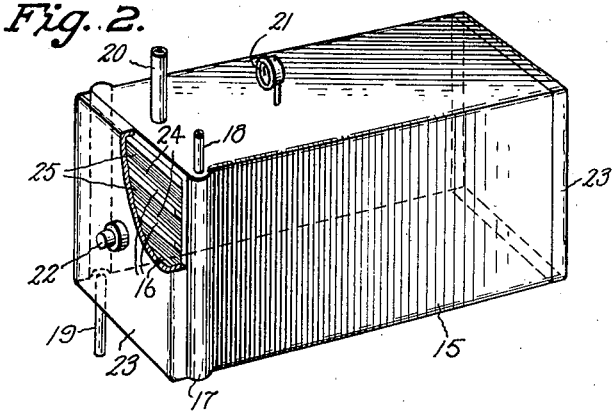
Fig. 2.
Fig. 3.
Fig. 4.
Inventor,
Emile J. Guay.
by
His Attorney.

Patented June 9, 1925.

1,541,641

UNITED STATES PATENT OFFICE.

EMILE J. GUAY, OF SWAMPSCOTT, MASSACHUSETTS, ASSIGNOR TO GENERAL ELECTRIC COMPANY, A CORPORATION OF NEW YORK.

MANUFACTURE OF LAMINATED MATERIAL FROM SPINNABLE TEXTILE WOVEN FABRICS AND AN ADHESIVE BINDER.

Application filed April 8, 1924. Serial No. 705,111.

REISSUED

*To all whom it may concern:*

Be it known that I, EMILE J. GUAY, a citizen of the United States, residing at Swampscott, in the county of Essex, State of Massachusetts, have invented certain new and useful Improvements in the manufacture of laminated material from spinnable textile woven fabrics and an adhesive binder, of which the following is a specification.

The present invention relates to the manufacture of laminated material from pieces of spinnable textile woven fabric such as canvas or cotton duck and an adhesive binder such as the phenolic condensation product known generally as bakelite which is hardened by being subjected to pressure and heat, and especially to the application of the adhesive binder to the woven fabric. My invention finds special utility where the laminated material is to be put to uses requiring great strength coupled with elasticity, that is, ability to deflect without breaking, an extensive application of this character being that wherein the material is used for gear wheels, such gear wheels being known as non-metallic or noiseless gear wheels.

In connection with my work of manufacturing material of this character, I discovered that a superior product was produced if in the process of manufacture the adhesive binder was applied primarily to the surface of the woven fabric as distinguished from having it distributed throughout the material of the fabric, that is having the fabric impregnated with the adhesive binder, as in the case when the sheets were treated by the ordinary so-termed wet process. This is set forth and forms the subject matter of my application Ser. No. 492,624 filed August 15, 1921. At that time the only commercially practical means of applying the adhesive to the woven fabric in accordance with my invention of which I was aware was that of applying it in powdered form between sheets of the woven fabric and that is the method particularly disclosed in my above mentioned prior application. However, from a manufacturing standpoint and especially in connection with some specific methods of manufacturing gear wheels or gear wheel blanks, such as for example, methods of the general character of those set forth in my Patents Numbers 1,501,027 and 1,501,028 both dated July 8, 1924, wherein the treated fabric is cut into pieces which are stacked together and formed directly into gear wheel blanks or other articles, the use of an adhesive binder in powdered form is not as convenient as it is in liquid form and I have now discovered a method whereby I am enabled to use the adhesive material in liquid form and at the same time obtain a product wherein after the solvent is driven off the adhesive is located primarily on the surface of the woven fabric. I can thus in the manufacture of laminated material of the character referred to use adhesive material in liquid form, i. e. in solution, and at the same time obtain a product as good as that which I have heretofore obtained when using powdered adhesive, which as is fully pointed out in my above first mentioned application is much superior to material manufactured by the wet method in ordinary use.

According to my invention, I first treat the woven fabric with the liquid adhesive. This is done preferably by passing the fabric through a tank in which the liquid is contained and results in the fabric being saturated or impregnated with the solution. The solution is used thin enough so that when the fabric is saturated with it in passing through it, there will be present in the fabric the desired amount of adhesive. In the case of a solution of bakelite in alcohol I have found a solution having a specific gravity slightly greater than one, that is of the order of 1.005 to 1.05, to be satisfactory.

Following this, I then dry the material to drive off the solvent. Instead of drying it in an ordinary oven, or in the open air as has been the common practice heretofore, however, I dry it in a vacuum oven, maintaining in the oven a good commercial vacuum, that is, a vacuum of the order of 25 to 29 inches of mercury. By this means I obtain two most important results as follows:—

1. During the drying process a major portion of the adhesive is brought to the surface of the fabric.

2. The solvent is removed from the fabric more completely than heretofore.

I then take the dried material, form it into stacks or piles of a character to result in a finished article of the desired shape and thickness, and subject the stack to pressure and heat to compress the stack and fuse the adhesive binder so as to cause it to take on its hard, infusible and insoluble form.

As to the first mentioned result, namely, that of bringing a major portion of the adhesive to the surface of the fabric, I believe this to be due to the fact that in drying the material in a vacuum oven with a good vacuum the solvent which may be alcohol in the case of bakelite, evaporates very quickly and rapidly and the ebullition carries the adhesive to the surface of the fabric to a considerable extent. In fact the evaporation of the alcohol at this low pressure is so very rapid as to be somewhat of the nature of an explosion and it is the utilizing of this feature for bringing the adhesive to the surface of the fabric that I consider a very important thing in connection with my invention.

As to the second mentioned result, namely, that of removing more completely the solvent from the fabric, it is of course known that heat "cures" the adhesive, i. e., changes it to its hard infusible and insoluble form and for this reason the extent to which the saturated fabric can be heated to drive off the solvent is limited for it must not be carried so far as to harden the adhesive to any great extent. However, even with the heating which has been considered permissible, I have found that after drying the saturated fabric for a time by the ordinary method, the exposed surface of the adhesive tends to harden and retard the evaporation of the adhesive. As a result with the ordinary wet method there has been an incomplete driving off of the solvent and this has resulted in a poorer product because the presence of the solvent during the final curing process tends to cause pockets in the product. By drying the saturated material in a good vacuum the evaporation of the solvent is much more rapid and at the same time the "curing" of the adhesive goes on much more slowly because of both the lower temperature which may be used and the low pressure. As a result I can expel practically all trace of solvent from the saturated material.

I will now describe in detail the specific steps which at present I prefer to employ in carrying out my invention, reference being made to the drawing.

In the drawing, Fig. 1 is a diagrammatic view illustrating apparatus which may be used in initially saturating the fabric with the adhesive solution, Fig. 2 is a diagrammatic view of a vacuum oven which may be used in drying the saturated fabric, and Figs. 3 and 4 are views which illustrate the distribution of the adhesive before and after the drying process.

Referring to Fig. 1 of the drawing, 5 indicates a tank containing the adhesive solution for example bakelite dissolved in alcohol, and 6 indicates a drying oven heated by steam coils 7. The oven is shown as comprising two compartments 8 and 9, each compartment being divided into two parts by partitions 10 which with advantage may be made of asbestos. The fabric is purchased in the form of rolls and a roll of the fabric as indicated at 11 may be placed on an arbor 12, unrolled and passed through the solution in tank 5 and the drying oven 6, and then rolled up again on an arbor 13. The arbors may be motor-driven. The fabric is passed over suitable rollers and guides 14 to direct it from the roll 11 through tank 5 and oven 6 to arbor 13. During its passage through the solution in tank 5 the fabric becomes saturated with the solution, and during its passage through oven 6 it becomes dried sufficiently so it is no longer sticky. The drying in oven 6 is a preliminary or initial drying and is for the purpose of drying the fabric sufficiently so it can be handled conveniently and without sticking. I have found drying for about two hours at a temperature of from 75 degrees centigrade to 85 degrees centigrade satisfactory. For example, I may dry it for one hour in compartment 8 at a temperature of about 85 degrees centigrade and then dry it for another hour in compartment 9 at a temperature of about 75 degrees centigrade. The fabric may be kept in motion continuously moving at such a rate that it is about two hours in passing through oven 6.

The fabric after it has been saturated with the solution and initially dried so it may be handled conveniently is removed from arbor 13, placed in a vacuum oven in which a good commercial vacuum is maintained as already referred to and dried to drive off the solvent. I have found drying for about three hours at a temperature of from 196 to 198 degrees centigrade in a vacuum of from 25 to 29 inches of mercury satisfactory. In Fig. 2, 15 indicates a vacuum oven which may contain spaced horizontal shelves 16 heated by hot water. At 17 is a header to which hot water is supplied by a pipe 18 and from which hot water flows through the shelves in parallel, and at 19 is an outlet pipe for the hot water. 20 indicates the connection for the vacuum pump, 21 a vacuum gauge, and 22 a suitable valve for use in breaking the vacuum when the oven is to be opened. The oven has a door 23 at each end.

For convenience in handling, the treated fabric as it comes from arbor 13 is cut in pieces of a size to fit into the oven 15 and suitable numbers of these pieces are stacked on to wire screens 24 of a size to be put on to shelves 16. I have found that putting about 8 pieces one on top of another on each screen is satisfactory. The screens with the fabric on them are put on the shelves in oven 15 after which the oven is closed. In Fig. 2, 25 indicates the sheets of fabric stacked on the screens 24. The vacuum pump is then operated to produce a vacuum in the oven and hot water is supplied to heat it. A suitable condenser may be placed in the connection to the vacuum pump for condensing the condensible vapors from the oven which comprise primarily the solvent driven off from the fabric. After the drying process is completed, the oven is opened and the treated fabric removed.

Figs. 3 and 4 are intended to illustrate in a somewhat diagrammatic manner the distribution of the adhesive in the fabric before and after the vacuum treatment. Fig. 3 illustrates the fabric as it comes from arbor 13 after being initially dried and shows that the adhesive is distributed throughout the threads of the fabric. Fig. 4 illustrates the fabric after it has been given the vacuum treatment and shows the adhesive as being located primarily on the surface of the fabric.

The sheets of treated fabric after being removed from the vacuum oven may be used to manufacture board or plate material from which gear wheel blanks for example may be cut or they may be cut into pieces of suitable shape and used to manufacture articles such as gear wheel blanks directly. In the former case a suitable number of the sheets are stacked one on another and placed in a suitable press, such as an hydraulic press and subjected to heavy pressure, this pressure being applied prior to the heating of the stack of sheets to fuse the adhesive and cure it, to cause it to assume its hard, infusible and insoluble state. I have found a pressure of from 600 pounds per square inch to 900 pounds per square inch satisfactory. While the stack is held under pressure, and preferably while it is still in the press, I subject it to heat to fuse the adhesive and cause it to permeate the layers of fabric. For this purpose I may use a suitable type of hydraulic press having hollow jaws to which steam may be supplied. The heating is preferably performed gradually. I may supply first steam of about 10 to 20 pounds pressure (temperature about 240° F.) for about ten minutes. The temperature may be then raised by supplying steam of 40 to 50 pounds pressure (temperature 285° to 295° F.) this temperature being maintained for from 10 to 15 minutes. Following this steam of about 110 pounds pressure (temperature about 345° F.) is supplied and this temperature is then maintained for about two hours or more depending upon the thickness of the stack of sheets. After the heating process is completed, the steam is shut off and the press cooled, the pressure being maintained during the cooling process. The press may be cooled by circulating water through the hollow jaws. After the material has been cooled to the desired extent the press is opened and the finished product removed. It is then ready to be used for any purpose to which it may be found applicable, for example, the making of gear wheels.

In the case where the sheets of material are cut into pieces of suitable shape which are stacked together and formed directly into an article the same general process as to the application of pressure and heat may be followed as that just described, a characteristic feature being that the pieces of material having the adhesive primarily on their outer surfaces are subjected to heavy pressure to consolidate them and while so held are heated to "cure" the adhesive. This phase of my method is more particularly pointed out and claimed in my application Sr. No. 492,624, already referred to. Specific instances wherein the material is cut into pieces which are stacked together into moulds to form definite articles are found in my patents hereinbefore referred to.

What I claim as new and desire to secure by Letters Patent of the United States is:—

1. The method of manufacturing a material of the character described from spinnable textile woven fabric and an adhesive binder, which comprises saturating the material with a solution of the adhesive binder, drying the material in a vacuum to remove the solvent and bring the adhesive primarily to the surface of the fabric, forming a stack from pieces of the material after having been thus dried, subjecting the stack to heavy pressure, and then heating the stack while held under pressure to fuse the adhesive binder.

2. In the manufacture of material of the character described from spinnable textile woven fabric and an adhesive binder, the method of applying the adhesive binder to the fabric which comprises first saturating the fabric with a solution of the adhesive binder and then drying it in a vacuum to drive off the solvent and bring the adhesive binder primarily to the surface of the fabric.

3. In the manufacture of material of the character described from spinnable textile woven fabric and an adhesive binder, the method of applying the adhesive binder primarily to the surface of the fabric which comprises first saturating the fabric with a solution of the adhesive binder, then drying the saturated material in an initial manner so it can be readily handled, and finally drying it in a vacuum so that the rapid ebullition of the solvent will carry the adhesive binder to the surface of the material.

In witness whereof, I have hereunto set my hand this 5th day of April, 1924.

EMILE J. GUAY.